Patented Nov. 28, 1950

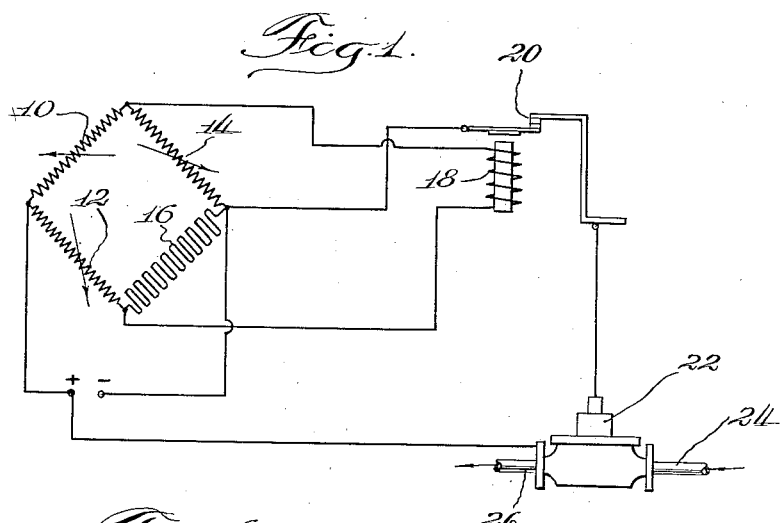
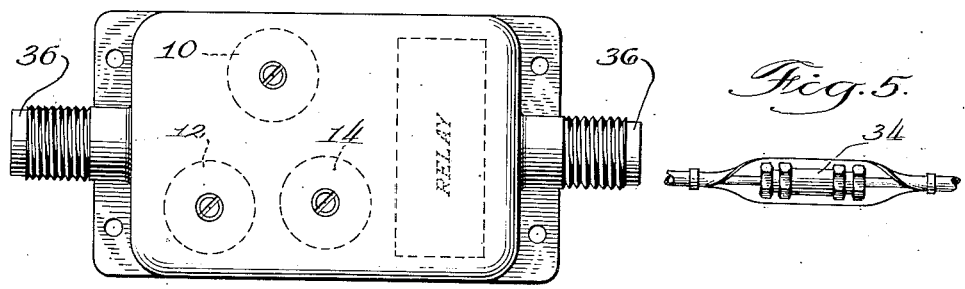
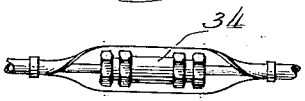
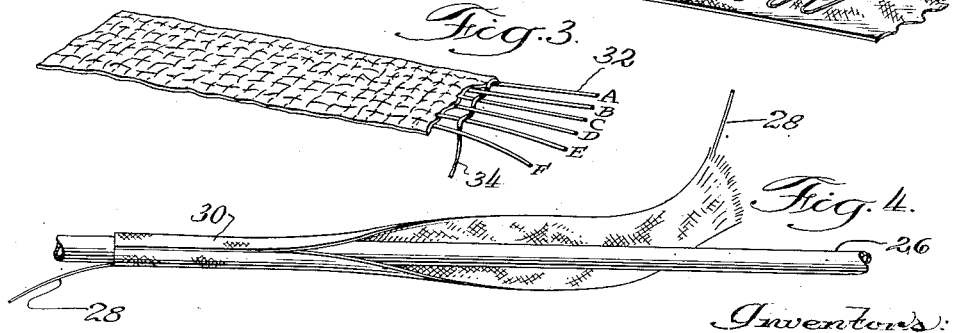

2,531,958

UNITED STATES PATENT OFFICE 2,531,958

PROTECTIVE DEVICE FOR FUEL LINES OR THE LIKE

Lynn A. Williams, Jr., and Arthur C. Allen, Chicago, Ill., assignors to Stewart-Warner Corporation, Chicago, Ill., a corporation of Virginia Application December 18, 1942, Serial No. 469,420

3 Claims. (Cl. 137—139)

The present invention relates to protective devices for fuel lines and the like, and is more particularly concerned with preventing the excessive loss of gasoline or other fluids from the fluid conduits when these conduits become perforated.

Recently the use of self-sealing fuel tanks in airplanes, particularly military airplanes, has received considerable attention, inasmuch as the leakage of fuel from a perforated fuel tank will result in the airplane having to discontinue flight sooner than was anticipated at the time of the take-off. Another danger is that the gasoline thus released may catch fire and destroy the aircraft. Similarly, the perforation of a fuel line will lead to the same result. However, the problem of preventing the escape of gasoline or other fuel from a fuel line cannot be solved by providing self-sealing fuel lines, since these lines are comparatively small and sections thereof may be completely shot away. Also it would add considerable weight to the structure to provide fuel lines of the required size if these lines were to be of a self-sealing type.

The present invention is concerned with providing an arrangement for automatically preventing the flow of fuel or other fluid through a perforated conduit, thus preventing the escape of the fluid. As an example, an airplane can be equipped with duplicate fuel lines as taught by the present invention so that if one of these fuel lines becomes perforated it will be automatically closed, fuel then flowing to the aircraft engine through the second parallel conduit.

It is therefore the principal object of the present invention to provide a novel arrangement for preventing the escape of fluid from a fluid line when the line becomes perforated.

An additional object of the present invention is to provide novel mechanism for closing valves when a fuel or other fluid line becomes perforated.

Yet another object of the present invention is to provide novel mechanism for indicating at a remote point that a conduit has become perforated.

Other objects and advantages will appear from the following description of a preferred embodiment of my invention illustrated in the accompanying drawings, in which similar characters of reference refer to similar parts throughout the several views.

In the drawings:

Fig. 1 is a diagrammatic representation of apparatus embodying the present invention applied to an airplane fuel line;

Figure 2 is a perspective view of a pipe-covering tape used in carrying out the present invention;

Figure 3 is a perspective view of an alternative form of tape which may be used in carrying out the present invention;

Figure 4 is a side elevation of an airplane fuel line conduit being covered with the tape shown in Figure 2 or 3;

Figure 5 shows one arrangement for carrying the tape shown in Figure 2 or 3 around a pipe fitting; and Figure 6 is a side elevation of a portion of the mechanism shown diagrammatically in Figure 1.

In Figure 1, we have shown a Wheatstone bridge formed of the branches 10, 12, 14 and 16 connected to a relay coil 18 in a well known manner. Three of the branches, 10, 12 and 14, of the bridge are adjustable so that the bridge can be balanced with respect to the fourth branch 16, so that when the bridge is properly balanced no current will flow in the coil 18. The coil 18 therefore remains unenergized, thereby permitting current to flow through the contacts 20 of the relay, and a solenoid valve 22. The valve is therefore energized and is of the type which remains open so long as energized.

Whenever the relay coil 18 is energized through unbalancing of the bridge, the contacts 20 will be separated, thereby deenergizing the solenoid valve 22. The solenoid valve under these conditions closes off communication between the two portions 24 and 26 of the conduit connected thereto. One of these portions, for instance the branch 24, leads to the fuel tank while the other branch leads to the airplane engine. When the solenoid valve 22 closes, therefore, fuel cannot flow beyond the valve 22. It therefore cannot escape through any perforations in the branch 26. Ordinarily valve 22 will be connected directly to the fuel tank or at least to a short branch which in turn is connected to the tank. The branch 24 therefore may be considered as comparatively short, while the main portion of the fuel line to the engine is comprised of the branch 26.

The branch 16 of the Wheatstone bridge may be formed as shown in Figure 2. It is comprised of a wire 28 which is shaped to a sinuous configuration and is disposed between two layers of insulating tape 30 which are secured together after the wire is in place. This tape is wrapped around the conduit 26 as shown in Figure 4 so that it covers the same and is secured thereto. Thus, the pipe 26 is closely covered by a network comprised of the wire 28 insulated between the strips 30. The two ends of the wire 28 are connected in the Wheatstone bridge in such manner that the wire 28 comprises the branch indicated in the bridge by the numeral 16.

It will be seen that a bullet passing through the pipe 26 will result in breakage of the wire 28, thus causing the bridge to become unbalanced. This in turn leads to closing of the valve 22 in the manner previously described, so as to interrupt the flow of fuel or other fluid through the pipe 26.

In Figure 3 is shown an alternative type of tape which may be used for the same purpose as that shown in Figure 2. In this tape the warp 32 is made up of metal strands, while the woof 34 is formed of fabric or some other insulating material. The warp strands 32 are connected alternately at their ends so that the current flows back and forth the length of the tape in a zig-zag manner; thus breaking of any of the warp strands 32 will interrupt the current flow. For instance, considering the outside warp strand at one edge of the tape as being indicated by the letter A while the next is indicated by the letter B and so on, these strands are connected so that at one end of the tape A is connected to B, at the opposite end of the tape B is connected to C, at the first end of the tape C is connected to D, and so on.

As shown in Figure 5, when a fitting 34 is encountered, the tape may merely be spread at this point to pass to one side of the fitting; preferably it should pass so as to cover as much of the fitting as possible so that a bullet hitting the fitting will in all probability also hit the tape.

In Figure 6 we have shown a box for containing the relay and bridge shown in Figure 1. Although these elements may be of any suitable form, in the device illustrated, the relay is mounted in one end of the box while the three elements 10, 12 and 14 of the bridge are located adjacent thereto. These resistance elements have slotted stems so that they can be adjusted by means of a screwdriver from the front of the case. At each end the box is equipped with standard A. N. type fittings 36 to which the electrical connections are made.

It will be appreciated that although we have shown a solenoid valve of the type which remains open when energized and closes when deenergized, a different type of valve may be used if desired. If the valve is of the type which normally remains open and closes when energized, then the contacts 20 would be placed upon the opposite side of the relay armature and would be normally open excepting when the coil 18 is energized. It will be appreciated also that an indicating instrument can be substituted for the coil 18. In this event the relay contacts 20 and solenoid valve 22 could be replaced by a hand operated valve which would be closed by the pilot whenever the indicating instrument indicated the flow of an electrical current therethrough.

Having thus described our invention, what we claim as new and desire to secure by Letters Patent of the United States is:

1. A protective system for a fuel conduit including a valve biased to closed position, electromagnetic means for opening said valve, a normally closed electric circuit for energizing said electromagnetic means, a relay circuit arranged and associated with said normally closed circuit so that when energized the normally closed circuit is deenergized, a balanceable bridge circuit so associated with the relay circuit as to energize the relay circuit when unbalanced and effect deenergization of the relay circuit when balanced, one of the legs of the bridge including a strip of tape of insulating material, a wire network in face to face relationship with the tape, a second strip of insulating tape secured in face to face relationship to the first strip and acting with said first strip to enclose said network, said network having a width at least substantially equal to the circumference of the conduit so that when the composite tape is wrapped around said conduit the network will substantially completely enclose said conduit while being insulated therefrom and from adjacent objects by said tapes.

2. A protected conduit including a valve biased to closed position, electromagnetic means arranged to open said valve when energized, a normally closed electrical circuit for energizing said electromagnetic means, a relay circuit associated with said normally closed circuit and arranged when energized to effect deenergization of said normally closed circuit, a bridge circuit associated with said relay circuit so as to deenergize said relay circuit when balanced and to energize it when unbalanced, one of the legs of the bridge comprising a wire network substantially enclosing said conduit and so positioned and arranged that external piercing of the conduit will so effect said wire network as to cause unbalance of said bridge.

3. A protective system for a fuel line including a valve biased to closed position for controlling flow through said fuel line, electromagnetic means for opening when energized said valve, a normally closed electric circuit for energizing said electromagnetic means, a relay circuit associated with said normally closed circuit and arranged when energized to effect deenergization of said normally closed circuit, a balanceable bridge circuit so associated with said relay circuit that when balanced the relay circuit is deenergized and when unbalanced the relay circuit becomes energized, said bridge circuit including a wire network surrounding the fuel line arranged to effect unbalance of the bridge circuit on forceful rupture of the fuel line.

LYNN A. WILLIAMS, JR.
ARTHUR C. ALLEN.

REFERENCES CITED

The following references are of record in the file of this patent:

UNITED STATES PATENTS

| Number | Name | Date |
| --- | --- | --- |
| 959,618 | Schmidt | May 31, 1910 |
| 1,256,960 | Watson | Feb. 19, 1918 |
| 1,276,589 | Steinmertz | Aug. 20, 1918 |
| 1,284,197 | Larner et al. | Nov. 5, 1918 |
| 1,658,848 | Kalikow | Feb. 14, 1928 |
| 1,777,732 | Pearson | Oct. 7, 1930 |
| 1,920,742 | Chapman | Apr. 1, 1933 |
| 1,953,244 | Luchey et al. | Apr. 3, 1934 |
| 1,965,004 | Rowell | July 3, 1934 |
| 2,060,215 | Hopkins | Nov. 10, 1936 |
| 2,120,301 | Tishman | June 14, 1938 |
| 2,155,060 | Phillips | Apr. 18, 1939 |
| 2,217,797 | Donovan | Oct. 15, 1940 |
| 2,236,891 | Bridges | Apr. 1, 1941 |
| 2,399,843 | Adams | May 7, 1946 |

FOREIGN PATENTS

| Number | Country | Date |
| --- | --- | --- |
| 433,864 | Great Britain | of 1935 |